INVENTOR.
CARL K. SHUMWAY JR.
BY Frank C. Parker
ATTORNEY

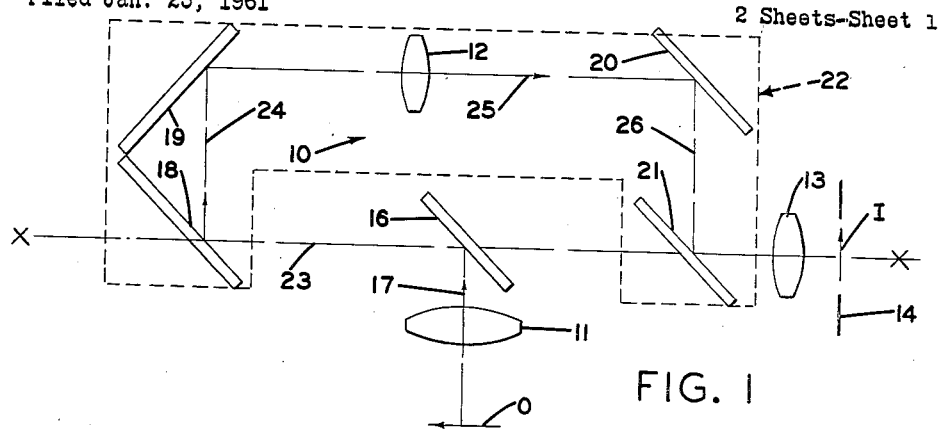
FIG. 1
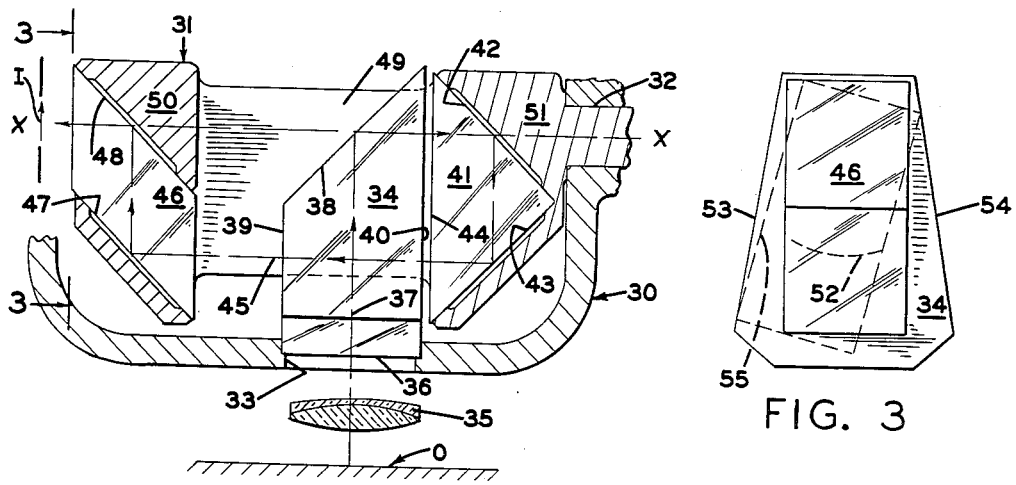
FIG. 2
FIG. 3
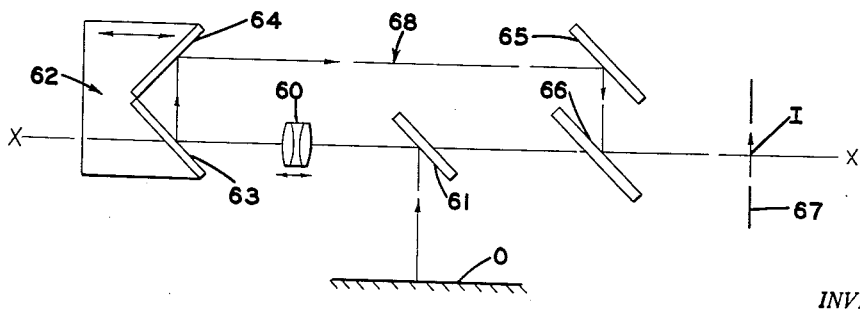
FIG. 4
INVENTOR.
CARL K. SHUMWAY JR.
BY
Frank C. Parker
ATTORNEY April 24, 1962  C. K. SHUMWAY, JR  3,030,857
IMAGE ROTATING OPTICAL SYSTEM
Filed Jan. 23, 1961  2 Sheets-Sheet 2

United States Patent Office 3,030,857
Patented Apr. 24, 1962

3,030,857
IMAGE ROTATING OPTICAL SYSTEM
Carl K. Shumway, Jr., East Rochester, N.Y., assignor to Bausch & Lomb Incorporated, Rochester, N.Y., a corporation of New York
Filed Jan. 23, 1961, Ser. No. 84,353
7 Claims. (Cl. 88—29)

The present invention relates to means for rotating the image formed by an optical system and more particularly relates to optical means for accomplishing this purpose.

In photogrammetric instruments such as stereoplotters and in certain other optical instruments it is desirable to introduce optical means for rotating the image seen by the observer and this is particularly true of stereoplotters and viewers wherein the relative orientation of certain features on a stereo pair of photographs is of considerable importance. In the prior art several optical devices have been provided for rotating the image as represented by a Dove prism or Pechan prism, for instance, but these devices are limited to parallel or near-parallel light, limited to small apertures, and are usually expensive to manufacture with the precision necessary for the high resolution and quality performance required in photogrammetric apparatus.

In view of the above-mentioned situation, it is an object of the present invention to provide a novel optical image rotating device for use in optical systems where precision performance is paramount.

It is a further object to provide such a device by simple and low-cost mechanism such as a series of flat mirrors or simple prisms which are so mounted that relative motion between certain of these elements may be secured.

Another object is to provide an optical image rotating mechanism which is so constructed and arranged that it is particularly suited to the requirements of stereoviewing and other photogrammetric instruments.

Further objects and advantages will be apparent in the arrangement and combination of parts and in the details of construction as described in the specification herebelow and shown in the accompanying drawings, wherein:

FIG. 1 is a schematic optical diagram illustrating one form of the present invention;

FIG. 2 is a side elevational view which is partly broken away and shown in section of a second form of the invention;

FIG. 3 is an end view taken on the line 3—3 of FIG. 2 of certain prismatic parts shown in that figure;

FIG. 4 is a schematic optical diagram illustrating a modification of the mechanism shown in FIG. 1; and FIG. 5 is a partly diagrammatic and partly midsectional view of a form of this invention which is particularly useful in photogrammetric stereoviewing instruments and the like.

Figure 5:
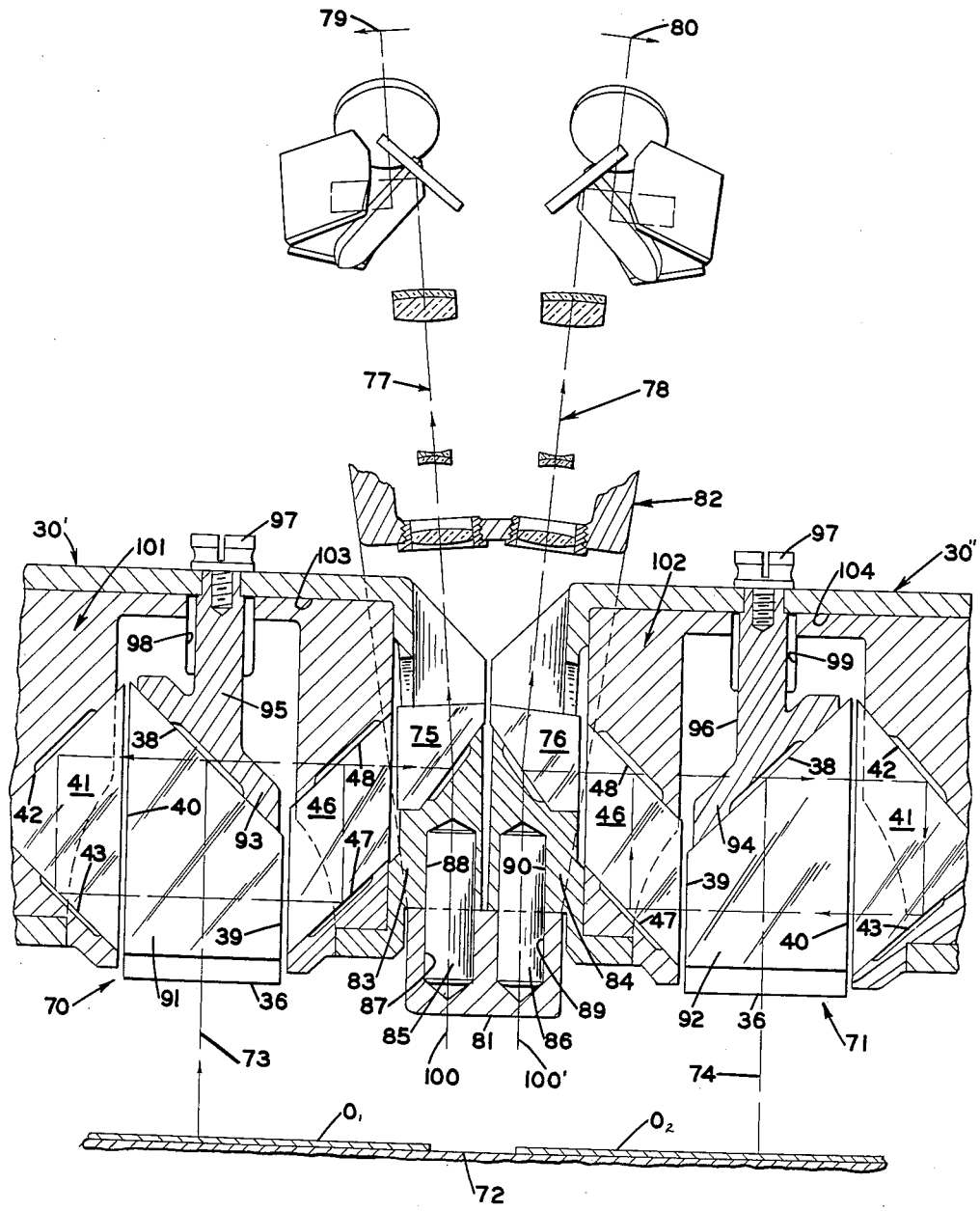

As shown in FIG. 1, the image rotating mechanism of this invention is constructed as a part of an optical system generally designated by the numeral 10, including a plurality of lens members 11, 12 and 13 which together form and transmit an image I of an object O at an image plane 14. It is not necessary that the lens members 11, 12 and 13 be located as shown as long as image forming means are present somewhere in the optical system.

According to the present invention, means are provided for optically rotating the image I, said means comprising a stationary mirror surface 16 which is located on an optical axis 17 and further comprising four movable mirror surfaces 18, 19, 20 and 21 which are mounted on a suitable frame 22, shown in dotted lines, the frame being mounted in any preferred manner for rotation about an axis X—X. An essential feature of the invention is the rectangular loop configuration of the optical axis of the optical system 10, said configuration being made up of a first section 23 between mirror surfaces 16 and 18 which is coaxial with said axis of rotation X—X, a second section 24 lying between mirrors 18 and 19, a third section 25 lying between mirrors 19 and 20, and a fourth section 26 lying between mirrors 20 and 21. The rectangular ray path thus defined is provided by the four mirrors 18 to 21 in combination, each mirror intersecting a corner of the rectangle at an angle of 45° to the adjacent optical axis sections, and the last mirror 21 facing outwardly to direct the optical axis in coincidence with the axis of rotation X—X. Axial section 24 must be equal and parallel to section 26. In all of the forms of this invention, the novel rectangular loop in the optical axis is provided in some variety of arrangement.

In the operation of this form of the invention, the assembled mirrors 18 to 21 with their supporting frame 22 are rotated as a unit about the axis of rotation X—X while the stationary mirror 16 remains fixed on the axis X—X whereby the image I rotates through an angle $2\theta$ while the frame 22 rotates through the angle $\theta$. For any required rotation of the image I, the angular displacement of the frame 22 is only half as much as the rotation of the image I.

A preferred and successful prismatic form of this invention is shown in FIG. 2 comprising a stationary housing 30 wherein a frame 31 is journaled at 32 for pivotal motion about an axis X—X. In the stationary housing 30 an opening 33 is provided and concentric with the opening, a deviation prism 34 is fixed in any suitable manner such as cementing in optical alignment with an object O, an image I of which is formed by a lens member which is symbolically shown at 35.

The flat entrance surface 36 of prism 34 is normal to the initial section 37 of the optical axis of the associated optical system. Opposite the entrance surface 36 of prism 34, an inclined mirror surface 38 is provided which intersects the optical axis 37 and deflects a section thereof into coincidence with the rotation axis X—X. The sides of the prism 39 and 40 are polished plane parallel surfaces which serve a purpose to be mentioned presently.

On the pivoted frame 31 and adjacent to the stationary prism 34 is mounted a right isosceles prism 41 which is provided with the right angled mirror surfaces 42 and 43 so as to form in effect a corner mirror, the plane surface 44 traversed by the entrant and exit rays being located in spaced relation to and parallel to the prism surface 40. The section 45 of the optical axis is established by the deviation of the "corner mirror" prism 41 and is deviated twice again into parallelism with the rotation axis X—X. The image rays traversing said section 45 travel undeviated through the part of prism 34 which is bounded by the parallel surfaces 39 and 40 whereby the optical axis is folded and the prism 34 is used for two separate passages of the image rays for the purpose of consolidating the image rotating device and reducing the space required therefor.

Also on the pivoted frame 31 is mounted a rhomboidal prism 46 having a pair of inclined mirror surfaces 47 and 48 which deviate the part 45 of the optical axis laterally thereof to an intersection with axis X—X as aforesaid whereat the optical axis is deviated again into coincidence with the axis X—X whereon is located the image I.

For the purpose of providing ample space for accommodating the stationary prism 34 when the frame 31 is pivoted, said frame is formed with two opposite connecting sections 49 which are united with the prism holding sections 50 and 51, said connecting sections being widely separated to provide ample clearance around the stationary prism 34. It will be seen that the aforesaid and essential rectangular loop in the optical axis including the section 45 is provided by the prisms 41 and 46 and this loop may be pivoted about the axis X—X so that the section 45 of the optical axis describes a dotted line position 52 in FIG. 3.

In order to maintain the image rays within the boundaries of the prism 34 when the frame 31 is pivoted throughout its range of movement, said prism is formed with a trapezoidal side profile as shown in FIG. 3 having the inclined sides 53 and 54. Shown superimposed over the stationary prism 34 in FIG. 3 is the movable rhomboidal prism 46 and by dashed lines 55 is shown the extreme pivoted position of the rhomboidal prism at one side.

A modification of the invention so far disclosed is shown in FIG. 4 which provides a zoom system for continuously changing the magnification of the image I either independently or simultaneously with the rotation of the image. In FIG. 4 is shown an optical system comprising at least a zoom lens 60 which forms a variably magnified image I of an object O. Nearest to the object O is a stationary inclined mirror surface 61 corresponding to surface 16 of FIG. 1 which deflects the image rays onto a corner mirror device 62 having the mirror surfaces 63 and 64 similar to surfaces 18 and 19 of FIG. 1. From the corner mirror 62 the image rays are directed upon an inclined mirror surface 65 and therefrom the rays are deflected upon a parallel inclined mirror surface 66 from whence the rays proceed to form the image I at its stationary image plane 67. It will be observed in FIG. 4 that this modification of the invention features the rectangular loop 68 in the optical system corresponding to the rectangular loop shown in FIG. 1 at 23, 24, 25 and 26.

The zooming function of the optical system shown in FIG. 4 is provided by mounting the zoom lens 60 and the corner mirror 62 for motion in the direction of the axis X—X by any desired means not shown, the axial motions of the corner mirror 62 and zoom lens 60 being different from each other and one motion being so related to the other that continuous variation in the magnification of the image I may be secured throughout a definite range without causing the image to move away from the image position 67. It will be seen in this latter form of the invention that the corner mirror 62 serves two purposes, i.e., to act as a component part of the image rotating means and to act as a component part of the mechanism wherewith the magnification of the image is varied.

A still further development of the present invention relates to the mechanism whereby the foregoing disclosure may be advantageously combined with a stereoviewing instrument or the like for stereophotogrammetrical use. Such an instrument is shown in FIG. 5 wherein two prism assemblies, which are generally indicated by numerals 70 and 71 and are constructed according to the mechanism shown in FIG. 2, are mounted in symmetrical arrangement for viewing a stereo pair of photographic objects $O_1$ and $O_2$ which are supported on a flat plate 72.

Similarly to FIG. 2, image rays from each object $O_1$ or $O_2$ following the optical axes 73 and 74, respectively, may be traced by means of arrows thereon through the prism systems 70 and 71, and a pair of associated deviation prisms 75 and 76 located intermediate thereof through the stereo pair of optical systems 77 and 78, respectively, which form a pair of images 79 and 80 at their respective eyepoints.

All parts of the prism assemblies 70 and 71 which are similar to corresponding parts found in FIG. 2 are designated by corresponding numerals.

A further advantageous feature embodied in this instrument in addition to those novel features above described resides in the swivel mountings which are provided for the housings 30′ and 30″ whereby the prism systems 70 and 71 may be moved in arcuate paths to provide a scanning motion over the stereo pair of objects $O_1$ and $O_2$. The term "scanning" may be interpreted stereo-photogrammetrically to particularly refer to the differential "Y" displacements, sometimes called aircraft drift, which are apparent in the stereo pair of pictures and which may occur between successive aerial camera exposure stations. The independent scanning motions for the two lines of sight 73 and 74 are accomplished manually by swinging the prism assemblies 70 and 71 about the vertical axes 100 and 100′.

For the above-mentioned purpose bosses 83 and 84 are formed on the adjacent inner portions of the prism housings 30′ and 30″ and said bosses are pivotally connected to the pad 81 by any preferred mechanism such as the pivot pins 85 and 86 which are seated at their opposite ends in fitted bores 87, 88, 89 and 90, respectively.

In this instrument the stationary prisms 91 and 92 are mounted in any suitable manner in holders 93 and 94 having supporting posts 95 and 96, respectively, therefor which are fixed in the housings 30′ and 30″, respectively, by any preferred means such as the cap screws 97 in a well-known manner. Transversely elongated clearance slots 98 and 99 are formed in the rotatable frames 101 and 102 to permit rotational movement thereof on their bearing surfaces 103 and 104. Although other means may be provided for rotating said frames, one simple mechanism therefor might involve extending the frames 101 and 102 axially sufficiently to form knurled hubs suitable for the grasp of the operator's fingers. It will be observed that the entire instrument is so constructed and arranged as to promote excellent facility of operation of the image rotating mechanism and the scanning mechanism in a quick and easy manner.

From the foregoing description it will be seen that a novel and useful optical image rotating device has been provided in complete fulfillment of the objects of this invention and although only certain forms of this invention have been shown and described in detail, other forms are possible and changes may be made in the details and arrangements of the parts thereof without departing from the spirit of this invention as defined in the claims herebelow appended.

I claim:

1. In an optical system having means for forming an image of an object, second means for rotating said image in a plane normal to the optical axis of said system, said second means comprising a plurality of mirror surfaces, four of which are located in fixed relation to each other with each mirror surface intersecting one of the respective corners of a rectangular configuration of said optical axis and are mounted to move as a unit together around a rotation axis which is coincident with one of the sides of said configuration, one of said mirror surfaces being located in a fixed inclined position on said rotation axis between two of the other mirror surfaces and being optically aligned so as to receive image rays from said object which is located laterally of the rotation axis, and deflect said rays in a direction coincident therewith, the mirror surface which is located on the rotation axis nearest to said image being inclined so as to direct image rays outwardly of said configuration along the rotation axis to an image point whereby said image is caused to rotate in a plane normal to said axis of rotation through twice the angle through which the mirror unit is rotated.

2. In an optical system having means for forming an image of an object, second means including an assembly of mirror surfaces which rotate in mutually fixed position as a unit about an axis of rotation and including a stationary mirror surface located at a fixed point on and inclined to said axis and located in optical alignment with and between two of the mirror surfaces in said assembly, means for pivotally mounting said assembly with the mirror surfaces secured thereon in such relative spatial and angular positions as to deflect the optical axis of said system into a rectilinear loop configuration with said axis of rotation being coincident with one side of said configuration, one of said two mirror surfaces facing toward and the other of said surfaces facing away from said stationary mirror surface so that image rays coming from said object first impinge on the stationary surface and are reflected therefrom around the rectilinear loop configuration of the optical axis and then outwardly therefrom to an image point where said image is formed whereby rotation of the mirror assembly about said axis of rotation through angle $\theta$ causes a rotation of $2\theta$ of said image in a plane normal to said axis.

3. In an optical system having means for forming an image of an object, prismatic means for rotating said image in a plane normal to the optical axis of said system, said prismatic means being so constructed and arranged as to form a parallel sided loop configuration in said optical axis, said prismatic means comprising a stationary deviation prism having a pair of plane parallel sides, a flat entrance surface formed normal to said sides on said prism through which image rays from said object are received, said prism having an inclined mirror surface formed thereon opposite to said entrance surface so as to deflect said rays through one of said parallel sides, said prismatic means further comprising a right isosceles prism which is so operatively aligned with the stationary prism as to act in the manner of a corner mirror which receives said image rays from the stationary prism and doubly reflects the rays back in a direction through the aforesaid parallel sides thereof, the optical axis of the entrant and exit rays traversing the isosceles prism being offset and parallel to each other, said prismatic means further comprising a rhomboidal prism located on the opposite side of the stationary prism from the isosceles prism and in optical alignment therewith so as to receive the rays which passed last through the stationary prism and stagger the optical axis to form an offset section of said optical axis extending coaxially with the rays which enter the isosceles prism, a frame pivotally mounted to rotate about an axis of rotation which is coaxial with said offset section, the isosceles prism and the rhomboidal prism being fixed thereon in relative positions such as to establish said loop configuration whereby said image may be rotated through an angle $2\theta$ when said frame is rotated through an angle $\theta$.

4. A claim according to claim 3 wherein said frame is constructed so as to freely straddle said stationary prism so as to provide a unitary structure for mounting the movable prisms while providing space for accommodation of the stationary prism when the frame is moved.

5. A claim according to claim 3 wherein the transverse profile of said stationary prism is trapezoidal in shape with the narrowest part thereof located adjacent to the axis of rotation and the widest part located where the relative motion between the component prisms is greatest to accommodate the entire field in all operative positions thereof.

6. In an optical system having means for forming an image of an object, second means for rotating said image in a plane normal to the optical axis of said system, said second means comprising a stationary mirror which is inclined to deflect the image rays coming from said object laterially along a first section of the optical axis at substantially 90° to the original direction, a pair of mirrors so constructed and arranged as to constitute a corner mirror which deflects the image rays first laterally and then parallel to said first section to form a second and a third section of the optical axis, a pair of parallel spaced flat mirrors facing each other and inclined at the same angle as said stationary mirror and so located and arranged as to deflect the third section of said optical axis first at 90° to form a fourth section which is parallel to the second section and then is again reflected to an image plane in a direction which is coextensive with said first section, a frame whereon said pairs of mirrors are fixed in the relationship described, the same frame being pivotally mounted on an axis of rotation which is coincident with the first and the last sections of the optical axis, and third means for varying the magnification of said image comprising an axially movable zoom lens operating in the first section of said optical axis and means for moving the first said pair of mirrors so as to change the long conjugate of the optical system according to such a law during the motion of said zoom lens that the image remains in focus at a stationary image position whereby said corner mirror participates in two functions, i.e., to rotate the image and to vary the magnification of the image.

7. In a stereoplotter instrument or the like for photogrammetric use having two lines of sight for viewing a stereo pair of picture areas, the combination of optical means located in each line of sight for rotating individually the respective images seen in said instrument for mutual alignment thereof, each line of sight including mechanism according to claim 2, individual housings wherein the two image rotating means are operatively mounted in spaced relation so that the two lines of sight related thereto are aligned individually with said picture areas, a support member wherein the optical systems which establish said two lines of sight are held in cooperative relation to each other, said support members having a mounting pad located between and underneath the inner adjacent ends of said housings, and means cooperatively formed on said pad and on said ends to pivotally mount each of said housings on the pad whereby the housings may be swung in an arc while the image rotating means is in operation to orientate certain features of said picture areas to each other when the features are located differently in said areas.

No references cited.